United States Patent [19]

Jonkers

[11] Patent Number: 4,984,681
[45] Date of Patent: Jan. 15, 1991

[54] BELT CONVEYOR WITH BELT PARTS CARRIED BY A GAS

[76] Inventor: Cornelius O. Jonkers, Zwaluwenweg 26, 1261 CJ Blaricum, Netherlands

[21] Appl. No.: 329,845

[22] Filed: Mar. 28, 1989

[30] Foreign Application Priority Data

Mar. 28, 1988 [NL] Netherlands .................. 8800782

[51] Int. Cl.$^5$ ............................................. B65G 15/60
[52] U.S. Cl. .................................................. 198/811
[58] Field of Search ......................................... 198/811

[56] References Cited

U.S. PATENT DOCUMENTS

| | | | |
|---|---|---|---|
| 756,600 | 4/1904 | Dodge | 198/811 |
| 3,583,551 | 6/1971 | Barnish | 198/811 |
| 3,734,271 | 5/1973 | Dolgolenko et al. | 198/811 |
| 3,744,619 | 7/1973 | Dolgolenko et al. | 198/811 |
| 3,859,923 | 1/1975 | Hamy . | |
| 3,889,802 | 6/1975 | Jonkers | 198/811 |
| 4,185,736 | 1/1980 | Jonkers | 198/811 |

FOREIGN PATENT DOCUMENTS

| | | | |
|---|---|---|---|
| 3603936 | 8/1987 | Fed. Rep. of Germany . | |
| 0391022 | 11/1973 | U.S.S.R. | 198/811 |
| 1107673 | 3/1968 | United Kingdom | 198/811 |

OTHER PUBLICATIONS

"Forderbander: Statt Tragrollen ein Luftfilm", by C. O. Jonkers, Fordern und Heben, vol. 22, No. 6, Apr./May 1972, pp. 291–385.

*Primary Examiner*—H. Grant Skaggs
*Assistant Examiner*—D. Glenn Dayoan
*Attorney, Agent, or Firm*—Fleit, Jacobson, Cohn, Price, Holman & Stern

[57] ABSTRACT

In a belt conveyor, the belt parts are carried by a gas. Each belt run moves over a trough bottom with apertures allowing gas to enter between the trough bottom and the belt run to carry it with low friction. The invention, aiming at optimum operating conditions, proposes to draw in the gas from the environment by a compressor through the apertures for the return, non loaded run of the belt and to blow gas by the same or another compressor to the apertures in the trough bottom for the upper, loaded run of the belt and to choose the apertures for the lower run so that there are at least 2 and at most 40 per meter length of the belt and that the total surface area of these apertures is at least 1.5 cm$^2$ and at most 20 cm$^2$ per m$^2$ belt surface area.

5 Claims, 2 Drawing Sheets

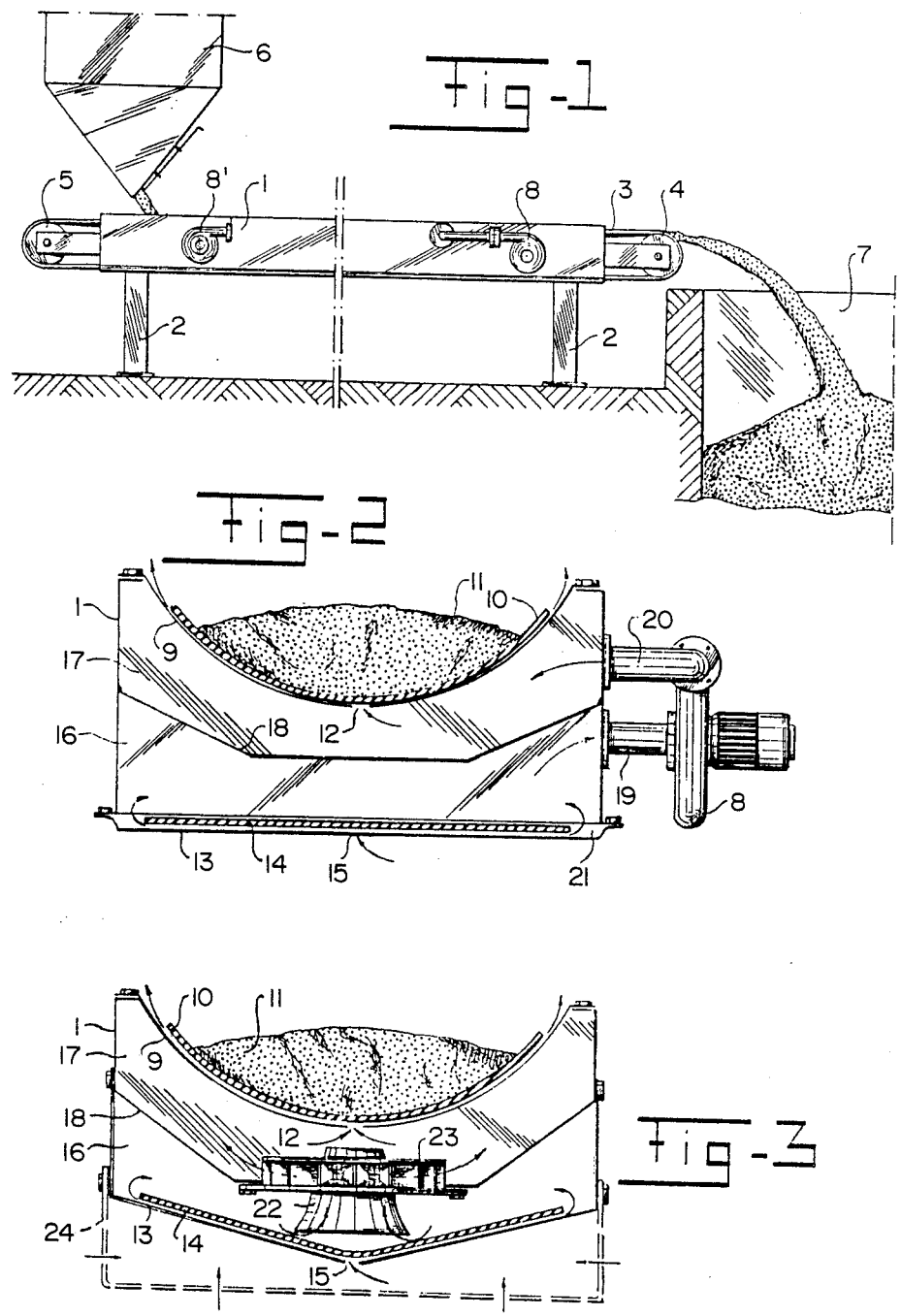

BELT CONVEYOR WITH BELT PARTS CARRIED BY A GAS

BACKGROUND OF THE INVENTION

1. Field of the Invention

The invention relates to a belt conveyor whose frame comprises a gas cabinet, the belt being conveyed with both parts over a trough bottom, said trough bottoms forming part of said gas cabinet and being provided with apertures, while one or more compressors are provided to take a gas such as air through the apertures in the trough bottoms until it is underneath said belt parts to carry them, said gas cabinet having a partition above the bottom part and under the trough bottom for the top part used for the conveyance of material and goods, in order to divide the cabinet into two separate gas chambers, while a compressor is connected by the suction side to the bottom gas chamber.

2. Description of the Related Art

Such a conveyor is known from U.S. Pat. No. 3,734,271. Here the conveyor is completely enclosed by an encasing. The compressor first forces the air under the bearing top part of the belt and then under the returning bottom part, so that it is forced in a closed circuit in series along the bottom of the belt parts. For this, the air leaving the side edges of the bearing part of the belt is collected by the encasing and conveyed to the cabinet part underneath the returning part. The compressor draws in from the chamber in the cabinet above the returning part. A through-running, broad slit is provided in the trough bottom of said returning part.

Such a design has a number of disadvantages. The encasing, also intended to prevent dust being produced in the surroundings, makes the design expensive and the returning part of the belt difficult to reach for repair and maintenance purposes. Good accessibility is, however, necessary because with almost all types of bulk goods particles thereof adhere to the bottom part and can remain in the cabinet part and accumulate there, so that this cabinet part will have to be cleaned at regular intervals. For this, the bottom side of the encasing and the bottom side of the air cabinet have to be detached. Depending on the type of bulk goods, this will have to be carried out, e.g. weekly or monthly, so that the time-consuming removal and refitting in airtight fashion of the various parts can mean an unacceptably high cost item, particularly in the case of conveyors which are several dozen meters long or more.

This known conveyor also has the major disadvantage that the trough bottom of the bottom part is provided with a broad slit running along the entire length, serving as a passage for the flowing gas underneath the bottom part. The slit is approximately 0.3 times the width of the belt. The wide passage for the gas, formed by the broad slit in the trough bottom of the returning part, means that with lateral connection of the compressor to the cabinet, in which the returning part is located, said part will be pressed upwardly much higher at the side of said connection than at the other side, and the gas in seeking the route of least resistance will flow in large quantities near such a compressor connection, and to a much lesser degree or not at all at greater distances from it. In the case of longer belts it is therefore necessary to use many compressors, and the returning part will be pressed up too high in some places and in the process can touch fixed parts of the cabinet and at other points rub over its trough bottom, and that part will become unstable, vibrate and flap up and down, in which case the whole structure can be subject to adverse and troublesome vibrations, and belt wear and energy consumption are unnecessarily high.

The object of the invention is to produce an improvement in this situation, so that a conveyor of simple design is obtained with a returning part which is carried uniformly by a gas film and operates stably without unnecessary energy being used, and is easily accessible for repair and maintenance work, such as periodic cleaning of the bottom cabinet part to remove the dust and grit which has collected in it and which has been brought in by the returning part.

SUMMARY OF THE INVENTION

To this end, a conveyor of the type mentioned in the preamble is characterized in that the compressor connected to the bottom gas chamber draws in gas from the environment through the apertures for the passage of the gas in the trough bottom of the bottom part, said apertures being distributed in an essentially regular pattern over the entire length of the conveyor, and the number of apertures is at least 2 and at most 40 per meter of length, and the joint surface area of the apertures is at least 1.5 cm$^2$ and at most 20 cm$^2$ per m$^2$ belt surface area.

In the case of U.S. Pat. No. 3,734,271 this surface area is approximately 3,000 cm$^2$ per m$^2$ belt surface area.

By way of further explanation it should be said that for good functioning of the conveyor a gas film underneath the returning part which is uniform and stable in all circumstances is extremely important. What is needed for this is a passage in the trough bottom of said part which is not too large, but not too small either, and which is not easily blocked, and the necessary gas flow must be adapted to it. Too large a passage allows the gas to flow too strongly locally out of the cabinet near the suction places for the gas along the underside of the returning part until it reaches the cabinet, so that some distance away no gas film is produced under the belt and the returning part scrapes over the trough bottom. If in the case of too large a passage, as known, the output of the gas flow were to be increased, the pressure drop in the cabinet of the gas flowing through it in the lengthwise direction to the discharge duct therefrom would increase rapidly (approximately in proportion to the square of the output), which causes an uneven distribution of the gas film in the lengthwise direction and also higher energy consumption of the compressor. This also increases the risk of unstable running of the returning part, through flapping and vibrating.

Too small a passage, without unnecessarily high energy consumption of the compressor, does not allow a gas flow which is needed for a carrying film of sufficient thickness, so that parts of the belt touch the trough bottom and friction occurs, which causes wear and requires additional energy to drive the belt.

Where there is excess pressure in the cabinet above a trough bottom, gas will leak out along the belt at the ends of the belt part where it goes into and comes out of the cabinet, which means a loss of energy. If there is partial vacuum in the cabinet, gas will flow inwards along those ends of the belt part in question.

By not forcing the gas under the returning part now, but by drawing it in from the environment through apertures in the trough bottom which lie within the limits indicated, it is possible to produce a good, stable air film under the bottom part with not too great an air output, while only a slight vacuum relative to the environment prevails in the bottom cabinet part, so that the inflow of air remains limited at the points where the bottom part goes into and comes out of the cabinet.

Due to the only slight vacuum in the bottom cabinet part, i.e. of the order of a few cm water column, it is easily possible to combine the compressor connected to it with a compressor which is also used for another purpose. A good possibility is to combine the compressor for the air flow under the bottom part with the compressor for the air flow under the top part, so that the bottom cabinet part is connected to the suction side of the compressor and the top cabinet part to the delivery side thereof. It has been found that in that case a good, stable air film can be produced under the two belt parts. The air flows for the bottom part and the top part are then in series, as is also the case in the abovementioned known conveyors, but with the compressor connected in an open circuit between the two air flows.

In this preferred embodiment the air flows under the two belt parts are practically the same, apart from some leakage at the inlet and outlet end of the returning part, but—as pointed out above—this is small, due to the low suction pressure of the compressor. In order to achieve an optimum design and a minimum energy consumption of the compressor, a certain relationship must exist between the joint surface area of the apertures in the trough bottom of the bottom part and the joint surface area of the apertures in the trough bottom of the top part. For this purpose, it is proposed according to the invention that the ratio between said surface areas should be brought to a value of 1 to 4, i.e. the joint surface area of the apertures in the trough bottom of the bottom part is equal to or no more than 4 times the joint surface area of the apertures in the trough bottom of the loaded top part.

Such a series connection of the air via the same compressor is known per se from U.S. Pat. No. 3,889,802, FIG. 4, but in that case the air is forced by the compressor into a cabinet part under the returning part. The inlet of the compressor is connected to the bottom cabinet part, so that here the infeed pressure for the air to the bottom part of the belt is higher than the infeed pressure of the air to the top part of the belt, which produces the above-mentioned disadvantages to an even greater extent than in the above-mentioned U.S. Pat. No. 3,734,271, and presses the unloaded bottom part upwards greatly relative to the trough bottom carrying it, away from said trough bottom.

BRIEF DESCRIPTION OF THE DRAWINGS

The invention will now be explained in greater detail with reference to the appended drawings, in which the gas used is air. In the drawings:

FIG. 1 is a side view of the conveyor, provided with separate compressors for the air flows to the top part of the belt and for that to the bottom part;

FIG. 2 is a vertical section of the conveyor, in which an ordinary commercially available air compressor is disposed beside the air cabinet which maintains the two air flows;

FIG. 3 is also a vertical section of a conveyor, in which a compressor is disposed in the air cabinet.

DESCRIPTION OF THE DISCLOSED EMBODIMENTS

Figure 4:
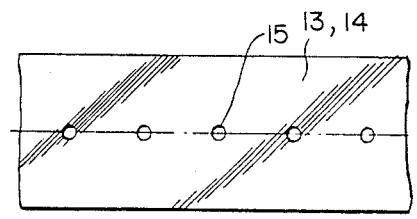
FIGS. 4 and 5 are a schematic view of a part of the returning part 14, each showing another possible pattern for the distribution of the apertures for the infeed of the carrying gas flow under that part, ,shown projected on that part.

In FIG. 1 an air cabinet 1 forms the frame of the conveyor, which is supported by columns 2. As will be described below, the cabinet is divided internally by a partition into a top and a bottom cabinet part. A conveyor belt 3 runs over the driving pulley 4 at the head end and the return pulley 5 at the tail end of the conveyor. The material to be conveyed is conveyed from the hopper 6 by the conveyor to the silo 7. An air compressor 8, in this case designed as a centrifugal compressor and with the delivery side connected to the top cabinet part, maintains the flow in the air film under the forwardly moving top part, while another centrifugal compressor 8', with the suction side connected to the bottom cabinet part, maintains the flow in the air film under the returning bottom part.

FIG. 2 shows how the top side of the air cabinet 1 is formed by the trough 9, provided with air apertures 12, for the top part 10 of the belt which is loaded with the material 11 to be conveyed.

The bottom side of the air cabinet 1 is formed by the trough 13, provided with air apertures 15, for the bottom part 14 of the belt. A partition 18 extending along the entire length divides the air cabinet into a bottom part 16 and a top part 17. The compressor 8 is connected by the suction side to the bottom part 16 of the air cabinet by means of a line 19 and at the delivery side to the top part 17 thereof by means of a line 20. Through the action of the compressor, air (or another medium, which then requires a separate inlet to the apertures 15) flows from the environment through the apertures 15 under the bottom part of the belt 14 into the chamber 16, and then passes via line 19 into the compressor, where it is brought to a higher pressure, and is conveyed through the line 20 into the chamber 17, following which it flows away, for example into the atmosphere, through the apertures 12 and under the top part of the belt 10. These air flows are indicated by arrows in the figure. The bottom part 14 of the belt passes through a slit-type aperture 21, the height of which is only slightly greater than the thickness of the belt, into the bottom part of the air cabinet, and comes out again in the same way at the other end. For the purpose of generating the air film under the bottom part of the belt, it is necessary to have a partial vacuum relative to the atmosphere in the chamber 16, said partial vacuum being determined by the flow resistance of the apertures 15 and by the pressure in the air film needed to raise the belt 14. Through good dimensioning of the apertures 15, this partial vacuum will be such, for example several cm water column, that an adequately uniform distribution of the air film is obtained along the entire length of the conveyor, without unnecessarily high energy consumption for the generation of the air flow. Due to the partial vacuum, not all the air in the chamber 16 will be drawn in through the apertures 15, but part of it will flow into the chamber through the slits 21, insofar as these are not covered by the bottom part 14. The air flow for the top part will thereby be greater than the air flow for the bottom part. This is not, however, a disadvantage, since the top part, with the weight of the material lying on it, needs a greater air flow for the same thickness of air film than the bottom part. On account of the small pressure differences, it could be possible in a simple manner to limit the air flow through the slits 21, for example by means of rubber flaps. As shown in FIG. 2, the bottom side 13 of the air cabinet is fitted so that it can be detached in a simple manner, and no special attention need be paid to the sealing between the two parts, on account of the only slight vacuum in the chamber 16. In this way the bottom part 14 of the belt and the interior of the chamber 16 are easily accessible, for example during periodic servicing to remove the dust and dirt, which has collected in that part and which has been brought in by the bottom part 14.

FIG. 3 shows an embodiment according to the invention with an inbuilt compressor. The compressor is fixed in an aperture of the partition 18, in such a way that the suction part 22 of the compressor is connected to the chamber 16 and the delivery part 23 to the chamber 17. A compressor used in this way, if it is a centrifugal compressor, does not need an outside wall (so-called volute) and can therefore be of a very simple design. Due to the inbuilt compressor the discharge and feed lines 19 and 20, with the pressure drop in the air flow occurring therein, are omitted, and the design of the conveyor is simplified and streamlined. The compressor shown in FIG. 3 is low in overall height, due to the fact that the drive motor is built into the compressor. The air flows are indicated by arrows in the same way as in FIG. 2. The bottom 13 of the air cabinet, also trough of the belt bottom part 14, is not flat here, but is designed slightly V-shaped. The advantage of this is that the center of gravity of the belt 14 can seek the lowest point, so that the belt remains running in the center of the air cabinet. Such a design is preferable in particular for long conveyors. Of course, the trough 13 can also have a different shape, for example part of a circle.

Since the air for the bottom part is drawn in directly from the environment, it may be advantageous in the case of a dusty environment to provide a filter bottom 24, which serves as a filter for cleansing the air drawn in. Such a filter bottom can be designed, for example, as a flat plate, or as a plate, bent to a U-shape, as shown in FIG. 3. This bottom can be fully perforated and serve as a filter, but detachable or fixed filter elements can also be provided at regular distances in said bottom. The filter bottom can extend along the entire length of the conveyor and thereby has a large surface area, which means that the filter can also have a great capacity and will not quickly become blocked.

Due to the fact that the air enters at the bottom, the filter can also be designed in such a way that it is easy to clean periodically, for example by beating or vibrating, so that the dirt from the filter falls downwards. If only part of the conveyor is in a dusty environment such as, for example, where the conveyor runs partly inside and partly outside a building, the filter bottom can be fitted only over the part in the dusty environment.

In all cases the cabinet can be made up of parts which can easily be taken apart, for example as shown in FIG. 3 by bolts between the parts 16 and 17 of the cabinet.

The use of a medium other than air can have advantages, for example if there is a risk of explosion, and for the conveyance of substances which must not or as little as possible come into contact with air, in which case a cover can be used then above the cabinet structure shown. The material to be conveyed can thus come into contact with, for example, only an inert gas.

Figure 5:
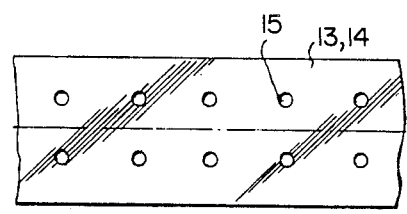

In FIG. 4 only one row of apertures 15 is provided in the center of the trough bottom 13 for the returning part, and in FIG. 5 there are only such apertures 15 on either side of said center. The apertures can also form different patterns, for example a row in the center and two rows on either side of it.

The apertures 12 in the trough bottom 9 of the bearing belt part 10 can have the same pattern or also differ from it, all kinds of combinations being possible.

The number of individual apertures in the trough bottom of the returning part is preferably at least three per meter of belt length.

The following can serve as an example. In a belt 1 meter wide there are in the case of FIG. 4 three circular apertures 15 per meter of belt length, i.e. at intervals of 33.3 cm, the diameter of the apertures being 8.5 mm. The apertures 12 for the top part are also at intervals of 33.3 cm and are the same pattern, and have a diameter of 5.2 mm.

In the pattern of FIG. 5 there are, for example, 12 apertures 15 per meter of belt length, i.e. they are at intervals of 16.7 in the lengthwise direction, each with a diameter of 10 mm. The apertures 12 can then have apertures with a diameter of 8 mm in the same pattern and at intervals of 30 cm in the lengthwise direction.

What is claimed is:

1. A belt conveyor having a frame which comprises a gas cabinet, the belt conveyor further including an endless belt having a load-conveying run and a return run, each of which travels over a respective trough bottom, said trough bottoms forming parts of said gas cabinet and each being provided with apertures, compressor means for causing a gas to pass through the apertures in the trough bottoms to respective positions underneath said belt runs, said gas cabinet having a partition above the belt return run and under the trough bottom for the belt load-conveying run, in order to divide the cabinet into two separate gas chambers, wherein the compressor means includes a compressor which is connected to the bottom gas chamber and which draws in gas from the environment to cause the passage of the gas through the apertures in the trough bottom for the belt return run, said apertures in the trough bottom for the belt return are distributed in an essentially regular pattern over the entire length of the conveyor, the number of these apertures is a least 2 and at most 40 per meter of belt length, the joint surface area of these apertures is at least 1.5 cm$^2$ and at most 20 cm$^2$ per m$^2$ of belt surface area, an enclosure is provided under the trough bottom for the belt return run and has peripheral edges connected to the trough bottom, and at least one wall of the enclosure includes a filter for the inflowing gas.

2. The belt conveyor according to claim 1, in which the compressor, which draws the gas out of the environment through the apertures in the trough bottom for the belt return run, forces this gas towards, under and through the apertures of the trough bottom for the belt load-conveying run, and in which the joint surface area of the apertures in the trough bottom for the belt return run per m$^2$ of belt surface area is equal to 1 to 4 times the joint surface area of the apertures in the trough bottom for the belt load-conveying run.

3. The belt conveyor according to claim 1, in which the number of individual apertures in the trough bottom for the belt return run is at least 3 per meter of belt length.

4. A belt conveyor having a frame which comprises a gas cabinet, the belt conveyor further including an endless belt having a load-conveying run and a return run, each of which travels over a respective trough bottom, said trough bottoms forming parts of said gas cabinet and each being provided with apertures, compressor means for causing a gas to pass through the apertures in the trough bottoms to respective positions underneath said belt runs, said gas cabinet having a partition above the belt return run and under the trough bottom for the belt load-conveying run, in order to divide the cabinet into two separate gas chambers, wherein the compressor means includes a compressor which is disposed in the longitudinal center of the gas cabinet partition and connected to the bottom gas chamber to draw in gas from the environment to cause the passage of the gas through the apertures in the trough bottom for the belt return run, the compressor also forces this gas through the apertures in the bottom trough for the belt load-conveying run, and said apertures in the trough bottom for the belt return run are distributed in an essentially regular pattern over the entire length of the conveyor, the number of these apertures is at least 2 and at most 40 per meter of belt length, the joint surface area of these apertures is at least 1.5 $cm^2$ and at most 20 $cm^2$ per $m^2$ of belt surface area, and the joint surface area of the apertures in the trough bottom for the belt return run per $m^2$ of belt surface area is equal to 1 to 4 times the joint surface area of the apertures in the trough bottom for the belt load-conveying run.

5. A belt conveyor having a frame which comprises a gas cabinet, the belt conveyor further including an endless belt having a load-conveying run and a return run, each of which travels over a respective trough bottom, said trough bottoms forming parts of said gas cabinet and each being provided with apertures, compressor means for causing a gas to pass through the apertures in the trough bottoms to respective positions underneath said belt runs, said gas cabinet having a partition above the belt return run and under the trough bottom for the belt load-conveying run, in order to divide the cabinet into two separate gas chambers, wherein the compressor means includes a compressor which is disposed in the longitudinal center of the gas cabinet partition and connected to the bottom gas chamber to draw in gas from the environment to cause the passage of the gas through the apertures in the trough bottom for the belt return run, the compressor also forces this gas through the apertures in the bottom trough for the belt load-conveying run, and said apertures in the trough bottom for the belt return run are distributed in an essentially regular pattern over the entire length of the conveyor.

* * * * *